(12) United States Patent
Huang

(10) Patent No.: US 11,252,670 B2
(45) Date of Patent: Feb. 15, 2022

(54) TERMINAL AND METHOD FOR ADJUSTING DISPLAY BRIGHTNESS OF TERMINAL

(71) Applicant: SHANGHAI HARVEST INTELLIGENCE TECHNOLOGY CO., LTD, Shanghai (CN)

(72) Inventor: Jiandong Huang, Shanghai (CN)

(*) Notice: Subject to any disclaimer, the term of this patent is extended or adjusted under 35 U.S.C. 154(b) by 0 days.

(21) Appl. No.: 16/621,702

(22) PCT Filed: Mar. 20, 2018

(86) PCT No.: PCT/CN2018/079618
§ 371 (c)(1),
(2) Date: Dec. 12, 2019

(87) PCT Pub. No.: WO2018/228010
PCT Pub. Date: Dec. 20, 2018

(65) Prior Publication Data
US 2020/0205072 A1   Jun. 25, 2020

(30) Foreign Application Priority Data
Jun. 12, 2017 (CN) .......................... 201710438622.6

(51) Int. Cl.
*H04M 1/00* (2006.01)
*H04W 52/02* (2009.01)
(Continued)

(52) U.S. Cl.
CPC ...... *H04W 52/027* (2013.01); *G06K 9/00067* (2013.01); *G06K 9/00362* (2013.01);
(Continued)

(58) Field of Classification Search
CPC ............. H04M 1/725; H04M 1/72522; H04M 1/72569; H04M 19/04; H04M 1/6016;
(Continued)

(56) References Cited

U.S. PATENT DOCUMENTS 10,304,326 B2 * 5/2019 Zhou ...................... G08C 17/02
2011/0109606 A1 * 5/2011 Sagawa ................ G09G 3/3406
345/207
(Continued)

*Primary Examiner* — Andrew Wendell

(57) ABSTRACT

Terminal and method for adjusting display brightness of terminal are provided. By disposing sensing unit and feature recognition area of display unit, when the terminal receives incoming call, as long as feature information of user is captured and compared with the feature information in brightness configuration information, if it matches, it adjusts the display brightness. Compared with the method of speech recognition, the user can adjust the screen brightness as long as the user approaches specific part to captures features without the need for the user to input additional speech, effectively improving the user's sensory experience. At the same time, the sensing unit of the present invention is directly disposed below the display unit, and no additional sensor (such as distance sensor) is needed to effectively reduce the overall thickness of the mobile device, so that the mobile device is thinner, and meets market demands.

22 Claims, 5 Drawing Sheets

(51) Int. Cl.
*G06K 9/00* (2022.01)
*G09G 5/10* (2006.01)
*H04M 1/60* (2006.01)

(52) U.S. Cl.
CPC ............ *G09G 5/10* (2013.01); *H04M 1/6016* (2013.01); *H04W 52/0254* (2013.01)

(58) Field of Classification Search
CPC ........... H04W 52/027; H04W 52/0254; G06K 9/00067; G06K 9/00362; G09G 5/10; G09G 3/20; G09G 2320/06; G06F 3/048
See application file for complete search history.

(56) References Cited

U.S. PATENT DOCUMENTS

| | | | | |
|---|---|---|---|---|
| 2011/0117902 | A1* | 5/2011 | Chang | H04W 4/80 |
| | | | | 455/418 |
| 2015/0145421 | A1* | 5/2015 | Chung | H05B 47/105 |
| | | | | 315/158 |
| 2015/0285479 | A1* | 10/2015 | Igaki | H05B 47/11 |
| | | | | 362/222 |
| 2017/0193909 | A1* | 7/2017 | Song | G09G 3/2074 |
| 2017/0285907 | A1* | 10/2017 | Li | G06F 3/0488 |
| 2017/0308225 | A1* | 10/2017 | Baek | G06F 3/04883 |
| 2020/0192719 | A1* | 6/2020 | Wilson | H01F 7/02 |

\* cited by examiner

TERMINAL AND METHOD FOR ADJUSTING DISPLAY BRIGHTNESS OF TERMINAL

BACKGROUND OF THE INVENTION

Field of the Invention

The present disclosure relates to the field of application of electronic device, in particular to a terminal and a method for adjusting the display brightness of a terminal.

Description of the Prior Art

With the development and advancement of technology, the touch display panels have been widely used in the devices that require the human-computer interaction interfaces, such as operating screens of industrial computers, tablet computers, touch screens of smart phones, and the like. When the user answers the call, if the terminal screen remains in the state of use, the terminal power consumption will be further increased, so that the terminal power is quickly exhausted, which is disadvantageous to the user's experience. Therefore, it is particularly necessary to automatically adjust the display brightness of the terminal when the user answers the call.

There are mainly the following methods for adjusting the display brightness of a terminal in the prior art:

One is to add a voice module to replace the light sensor to adjust the brightness of the terminal screen. A terminal including a microprocessor, an audio output unit, a sound sensor, and a display screen is disclosed in the application number "201610511375.3"; the audio output unit is configured for outputting a sound signal; The sound sensor is configured for sending a display adjustment instruction to the microprocessor when a reflected sound signal of the sound signal output by the audio output unit is collected; the microprocessor is configured for adjusting the brightness of the display screen when receiving the display adjustment instruction and determining that the terminal is in a call state. On the one hand, this solution requires the terminal to add additional sound sensors, increasing the terminal cost; on the other hand, the user still needs to trigger the adjustment of the display brightness by the sound, and the difference from the manual adjustment is not very large in essence, and it is not possible to automatically adjust the brightness of the display screen when the user answers the call.

The other is to adjust the brightness of the terminal by sensing the distance between the terminal and the occlusion object. A method and system for realizing volume and brightness adjustment based on proximity sensors is disclosed in the application number "201610627457.4", the method includes: the proximity sensor in the mobile terminal acquires a distance between the occlusion object and the touch screen, and determines whether the distance value is within a preset distance range; when it is determined that the distance value is within a preset distance range, adjusting a value of the mobile terminal parameter to a parameter corresponding to the distance value according to a correspondence between the preset distance range and the mobile terminal parameter; the mobile terminal parameter include: volume, screen brightness, and flash brightness. In this solution adding the proximity sensor is needed on the terminal and will change the original structure of the terminal and increase the cost; on the other hand, there is no obvious definition for occluding objects, that is, any object that is close enough to the terminal will initiate adjustment of the brightness of the screen, which is often prone to misoperation and cannot be applied to the demand of the microphone mode when the user answers the call.

In summary, it is particularly necessary to provide a scheme that can adaptively adjust the brightness of the screen of the mobile phone without changing the original architecture of the terminal, so as to achieve power saving and user experience improvement regardless of the listening mode of the terminal.

SUMMARY OF THE INVENTION

A technical problem to be solved by the present disclosure is to provide a terminal and a method for adjusting display brightness of a terminal, so as to solve the problems that the terminal cannot adaptively adjust the screen brightness when receiving a call, resulting in problems such as large power consumption and poor user experience when the terminal answers a call.

In order to solve the above technical problem, the technical solution adopted by the present disclosure is a method for adjusting display brightness of a terminal. The method is applied to a terminal, and the terminal includes a display unit and a sensing unit. The display unit is provided with a feature recognition area, and the sensing unit is located under the feature recognition area, and is configured to capture feature information of a user. The method includes the following steps: setting the brightness configuration information in advance, the brightness configuration information including a correspondence relationship between feature information of a user and display brightness; capturing the feature information of the user, and determining whether the captured feature information matches the feature information in the brightness configuration information; if yes, adjusting the display brightness of the terminal to the display brightness corresponding to the matched feature information in the brightness configuration information; otherwise, not adjusting the display brightness of the terminal.

In some embodiment, the step of setting the brightness configuration information in advance includes: receiving a user setting instruction and displaying the feature recognition area; capturing and saving the feature information of the user during the setting process; displaying a display brightness information list, receiving a user's selection instruction for display brightness information, and establishing and saving the correspondence relationship between the selected display brightness information and the captured feature information of the user during the setting process.

In some embodiment, the feature information includes one or more of face feature information, fingerprint feature information, human ear feature information, and lip feature information.

In some embodiment, when the terminal is in a listening mode, the feature information is human ear feature information, and the human ear feature information includes ear contour information; the step of "capturing the feature information of the user, and determining whether the captured feature information matches the feature information in the brightness configuration information" includes: capturing the ear contour information of the user, and determining whether the captured ear contour information matches the ear contour information in the brightness configuration information.

In some embodiment, when the terminal is in a microphone mode, the feature information is fingerprint feature information, and the microphone mode is triggered by the user clicking a first button; the step of "capturing the feature information of the user, and determining whether the captured feature information matches the feature information in the brightness configuration information" includes: capturing the fingerprint feature information of the user while receiving the user's instruction of clicking to the first button, and determining whether the captured fingerprint feature information matches the fingerprint feature information in the brightness configuration information.

In some embodiment, the step of "determining whether the captured feature information matches the feature information in the brightness configuration information" includes: determining whether a matching degree between the captured feature information and the feature information in the brightness configuration information reaches a preset percentage, and if so, it is determined to be a match, otherwise it is determined to be a mismatch.

In some embodiment, the method further includes the step of generating a prompt message when determining that the captured feature information does not match the feature information in the brightness configuration information.

In some embodiment, the prompt message includes one or more of sound prompt message, image prompt message, light prompt message, and video prompt message.

In some embodiment, the method further includes the step of setting volume configuration information in advance; the volume configuration information includes a correspondence relationship between the feature information of the user and a volume level, after the step of "determining whether the captured feature information matches the feature information in the brightness configuration information", the method further includes: if yes, adjusting the volume of the terminal to a volume corresponding to the feature information in the volume feature information, otherwise not adjusting the volume of the terminal.

In some embodiment, the sensing unit includes a light detection sensing layer, the display pixels of the display unit is configured to emit light with a predetermined pattern when a light source trigger signal is received by the light detection sensing layer; and the light detection sensing layer is configured to be in a light signal detection state and receive an image signal reflected by a user's feature portion to capture the user's feature information when a detection trigger signal is received.

In some embodiment, the sensing unit includes a TFT image sensing array film, the light detection sensing layer comprises an array formed by photodiodes.

In some embodiment, the light source trigger signal and the detection trigger signal are alternately switched in a preset frequency.

In some embodiment, the display unit is a display panel using active array thin film transistors for scan driving and transmitting data, and the display unit includes an AMOLED display, a liquid crystal display, a micro light emitting diode display, a quantum dot display, or an electronic ink display.

In some embodiment, the display unit is the liquid crystal display, a backlight unit is disposed under the sensing unit; and the sensing unit is disposed between the backlight unit and the liquid crystal display.

In some embodiment, the feature recognition area includes a plurality of feature recognition sub-areas, and a sensing unit is disposed corresponding to each of the feature recognition sub-areas.

In some embodiment, the terminal further includes a sensing unit control circuit, the method further including: receiving an instruction of the user for starting the feature recognition sub-area, the sensing unit control circuit turning on the sensing unit under the feature recognition sub-area, and receiving another instruction of the user for closing the feature recognition sub-area, the sensing unit control circuit turning off the sensing unit under the feature recognition sub-area.

A terminal is provided. The terminal includes a display unit and a sensing unit, a feature recognition area is disposed on the display unit, the sensing unit is located under the feature recognition area and is configured to capture feature information of a user; the terminal further includes a configuration information setting unit, a determining unit, and a processing unit; the configuration information setting unit is configured to set the brightness configuration information in advance, and the brightness configuration information includes a correspondence relationship between feature information of a user and display brightness; the sensing unit is configured to capture the feature information of the user and the determining unit is configured to determine whether the captured feature information matches the feature information in the brightness configuration information; if yes, the processing unit is configured to adjust the display brightness of the terminal to the display brightness corresponding to the matched feature information in the brightness configuration information; otherwise, the processing unit does not adjust the display brightness of the terminal.

In some embodiment, the terminal further includes an operation instruction receiving unit, "the configuration information setting unit is configured to set the brightness configuration information in advance" includes: the operation instruction receiving unit is configured to receive a setting instruction of the user and display the feature recognition area; the sensing unit is configured to capture and save the feature information of the user during the setting process; the display unit is configured to display a display brightness information list, the operation instruction receiving unit is configured to receive a user's selection instruction for display brightness information, and the processing unit is configured to establish and save the correspondence relationship between the selected display brightness information and the captured feature information of the user during the setting process.

In some embodiment, the feature information includes one or more of face feature information, fingerprint feature information, human ear feature information, and lip feature information.

In some embodiment, when the terminal is in a listening mode, the feature information is human ear feature information, and the human ear feature information includes ear contour information; "the sensing unit is configured to capture the feature information of the user and the determining unit is configured to determine whether the captured feature information matches the feature information in the brightness configuration information" includes: the sensing unit is configured to capture the ear contour information of the user, and the determining unit is configured to determine whether the captured ear contour information matches the ear contour information in the brightness configuration information.

In some embodiment, the terminal includes an operation instruction receiving unit, when the terminal is in a microphone mode, the feature information is fingerprint feature information, and the microphone mode is triggered by the user clicking a first button; "the sensing unit is configured to capture the feature information of the user and the determining unit is configured to determine whether the captured feature information matches the feature information in the brightness configuration information" includes: the operation instruction receiving unit is configured to capture the fingerprint feature information of the user while the sensing unit is configured to receive the user's instruction of clicking to the first button, and the determining unit is configured to determine whether the captured fingerprint feature information matches the fingerprint feature information in the brightness configuration information.

In some embodiment, "the determining unit is configured to determine whether the captured feature information matches the feature information in the brightness configuration information" includes: the determining unit is configured to determine whether a matching degree between the captured feature information and the feature information in the brightness configuration information reaches a preset percentage, and if so, it is determined to be a match, otherwise it is determined to be a mismatch.

In some embodiment, the processing unit is further configured to generate a prompt message when the determining unit determines that the captured feature information does not match the feature information in the brightness configuration information.

In some embodiment, the prompt message includes one or more of sound prompt message, image prompt message, light prompt message, and video prompt message.

In some embodiment, the configuration information setting unit is configured to preset volume configuration information; the volume configuration information includes a correspondence relationship between the feature information of the user and a volume level, the determining unit is configured to determine whether the captured feature information matches the feature information in the brightness configuration information", if yes, the processing unit is configured to adjust the volume of the terminal to a volume corresponding to the matched feature information in the volume feature information, otherwise the processing unit does not adjust the volume of the terminal.

In some embodiment, the sensing unit includes a light detection sensing layer, the display pixels of the display unit is configured to emit light with a predetermined pattern when a light source trigger signal is received by the light detection sensing layer; and the light detection sensing layer is configured to be in a light signal detection state when receive an image signal reflected by a user's feature portion to capture the user's feature information when a detection trigger signal is received.

In some embodiment, the sensing unit includes a TFT image sensing array film, the light detection sensing layer comprises an array formed by photodiodes.

In some embodiment, the light source trigger signal and the detection trigger signal are alternately switched in a preset frequency.

In some embodiment, the display unit is a display panel using active array thin film transistors for scan driving and transmitting data, and the display unit includes an AMOLED display, a liquid crystal display, a micro light emitting diode display, a quantum dot display, or an electronic ink display.

In some embodiment, the display unit is the liquid crystal display, a backlight unit is disposed under the sensing unit, and the sensing unit is disposed between the backlight unit and the liquid crystal display.

In some embodiment, the feature recognition area includes a plurality of feature recognition sub-areas, and a sensing unit is disposed corresponding to each of the feature recognition sub-areas.

In some embodiment, the terminal further includes a sensing unit control circuit, the operation instruction receiving unit is configured to receive a start instruction of the user for the feature recognition sub-area, the sensing unit control circuit is configured to turn on the sensing unit under the feature recognition sub-area, and the operation instruction receiving unit is configured to receive a closing instruction of the user for the feature recognition sub-area, the sensing unit control circuit is configured to turn off the sensing unit under the feature recognition sub-area.

The advantages by adopting the above technical solutions are: by disposing a sensing unit and the feature recognition area of the display unit, when the terminal receives an incoming call, as long as the feature information of the user is captured and compared with the feature information in the brightness configuration information, if it matches, the display brightness is adjusted. Compared with the method of speech recognition, the user can adjust the screen brightness as long as the user approaches to a specific part to captures features without the need for the user to input additional speech, effectively improving the user's experience. At the same time, the sensing unit of the present disclosure is directly disposed below the display unit, and no additional sensor (such as a distance sensor) is needed to effectively reduce the overall thickness of the mobile device, so that the mobile device is thinner, and meets market demands. The adjustment of the display brightness is achieved by capturing the user's feature information for comparison, avoiding misoperation by the user and improving the accuracy of the screen brightness adjustment.

DESCRIPTION OF THE PREFERRED EMBODIMENTS

Technical contents, structural features, implemented objectives and effects of the present disclosure will be described in detail below in combination with embodiments and with reference to the accompanying drawings.

Figure 1:
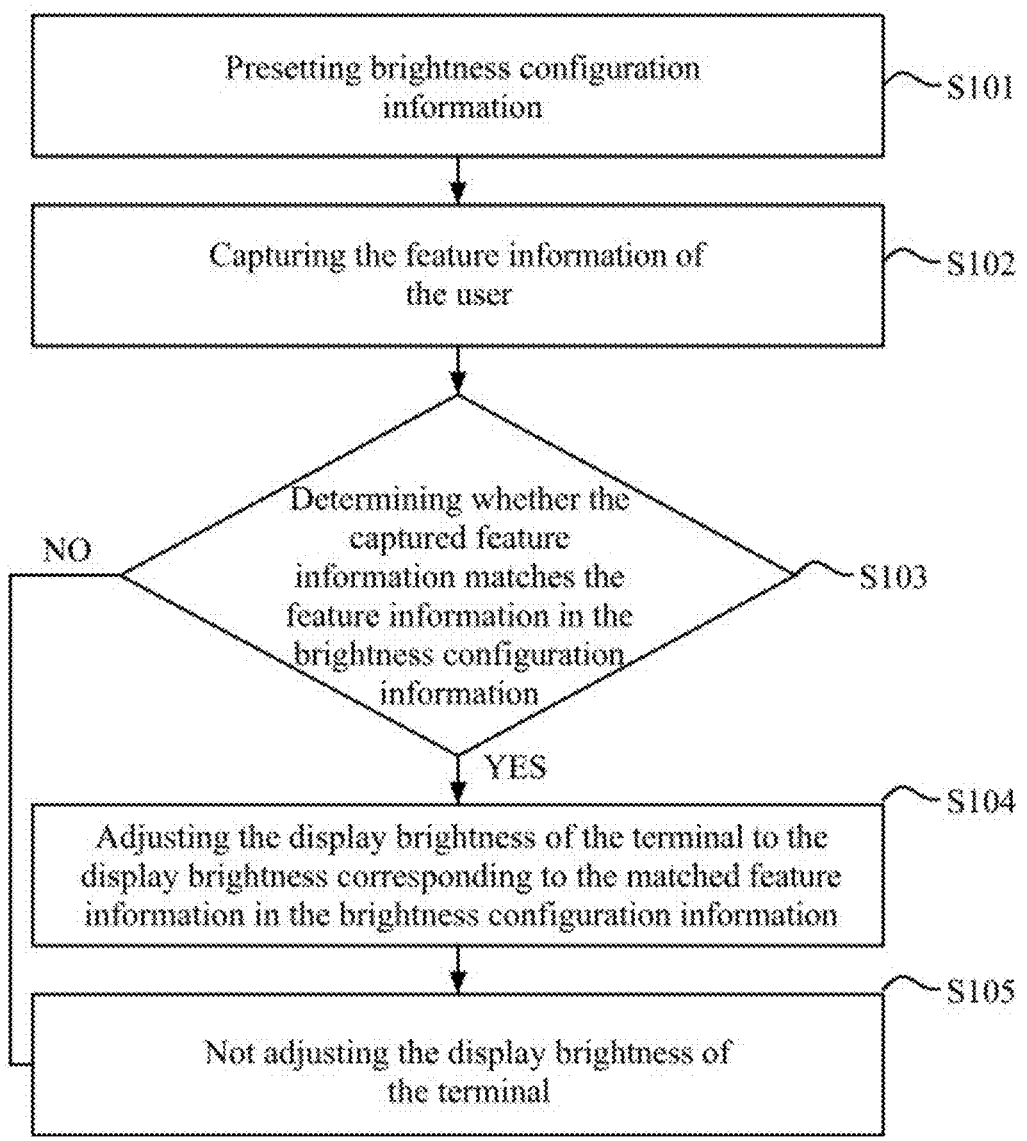
FIG. 1 is a flowchart of a method for adjusting display brightness of a terminal according to an embodiment of the present disclosure.

Please refer to FIG. 1, which is a flowchart of a method for adjusting display brightness of a terminal according to an embodiment of the present disclosure. The method is applied to a terminal and the terminal is an electronic device with a touch display screen, such as a cell phone, a tablet computer, a personal digital assistant or other smart mobile device, or such as a personal computer or a computer for industrial equipment, or other electronic device.

The terminal includes a display unit and a sensing unit. A feature recognition area is disposed on the display unit and the sensing unit is located under the feature recognition area and is configured to capture feature information of a user. The display unit is a display panel using active array thin film transistors for scan driving and transmitting data, such as an AMOLED display, a liquid crystal display (LCD), a micro light emitting diode display, a quantum dot display, or an electronic ink display. In other embodiments, the display unit may be another electronic element having a display function. The method includes the following steps.

In step S101 the brightness configuration information is preset. The brightness configuration information includes a correspondence relationship between feature information of a user and display brightness. In this embodiment, the feature information includes one or more of face feature information, fingerprint feature information, human ear feature information, and lip feature information. In some embodiment, the face feature information is face contour information, in this way, when the image captured by the sensing unit has a rough face image, the adjustment of screen display brightness will be done without the comparison of details. Thus, the adjustment of the brightness of the display unit is more convenient, satisfying the requirement of automatic fast adjustment. The human ear feature information and the lip feature information can be applied in the same way, and will not be repeated here.

The display brightness of the brightness configuration information is the display brightness preset by the user. Each user's feature information corresponds to a display brightness, and each display brightness may correspond to multiple users' feature information. The brightness configuration information is such as stored in a storage unit of the terminal, such as the memory of the mobile phone, the hard disk of the computer. Or the brightness configuration information is stored in a storage unit of the server, when the brightness configuration information is needed, only by making the terminal being communication connection with the server, the pre-stored brightness configuration information will be gotten from the server. The communication connection includes a wired communication connection or a wireless communication connection.

In step S102, the feature information of the user is captured. In this embodiment, the coverage range of the sensing unit is adapted to the size of the display unit. In some embodiment, the shape of the sensing unit is rectangular, and the size of the rectangle is located at the center of the display unit. In other embodiments, there are multiple sensing units, as long as the multiple sensing units are spliced into a size suitable for the display unit and placed under the display unit.

In step S103, it is determined whether the captured feature information matches the feature information in the brightness configuration information. If yes, it proceeds to step S104 to adjust the display brightness of the terminal to the display brightness corresponding to the matched feature information in the brightness configuration information; otherwise, it proceeds to step S105 to not adjust the display brightness of the terminal. The comparison of user's feature information is such as realized by a feature information recognition algorithm, and the related feature information recognition algorithm is such as stored in the storage unit of the terminal in advance. Taking fingerprint information as feature information as an example, when the sensing unit obtains fingerprint information of the user on the feature recognition area, the processor of the terminal will call the fingerprint recognition algorithm in the storage unit, and compare the obtained fingerprint information with the fingerprint information in the brightness configuration information to determine whether the two match. The fingerprint recognition algorithm includes the steps of pre-processing the fingerprint image, data feature extraction, feature matching, fingerprint recognition, etc., which can be implemented with a variety of algorithms. These algorithms are mature existing technologies, and have been applied to various encryption and decryption fields, and will not be repeated here.

Figure 2:
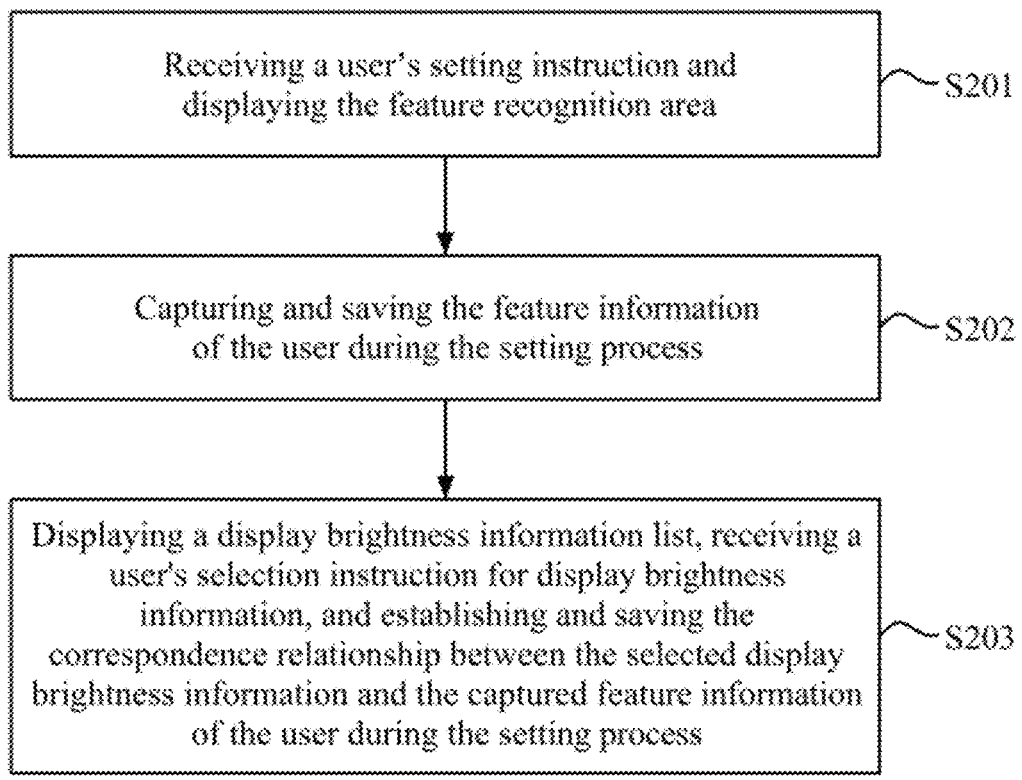
FIG. 2 is a flowchart of a method for adjusting display brightness of a terminal according to another embodiment of the present disclosure.

Please refer to FIG. 2, which is a flowchart of a method for adjusting display brightness of a terminal according to another embodiment of the present disclosure. The step of setting the brightness configuration in advance includes:

In step S201 of receiving a user's setting instruction and displaying the feature recognition area. A setting instruction is triggered by the user clicking a button in a setting bar on the screen. After receiving the setting instruction, the terminal will display the feature recognition area, so that the user can align the feature information to be input with the feature recognition area for the sensing unit to capture. In this embodiment, displaying the feature recognition area may include increasing the brightness of the feature recognition area or displaying a prompt input box on the feature recognition area. In some embodiments, before receiving the user's setting instruction, the method further includes receiving account information of the user and the account information includes a user ID and a password. The user needs to input the correct user ID and password by means of voice control, eyeball control, or key password control, and only after logging in to the user account can the setting instruction be triggered. In this way, the security of setting the brightness configuration information is improved on the one hand, and on the other hand, the effect of distinguishing different users and saving different brightness configuration information on one terminal is achieved.

Then it proceeds to a step S202 of capturing and saving the feature information of the user during the setting process. In this embodiment, the terminal includes a storage unit. The step S202 includes: determining whether the user's feature information captured in the setting process has been stored in the storage unit. When the determination is yes, the user is prompted that the feature information is entered; when the determination is no, the feature information is saved to the storage unit. This can effectively avoid repeated entry of feature information.

In step S203 of displaying a display brightness information list, receiving a user's selection instruction for display brightness information, and establishing and saving the correspondence relationship between the selected display brightness information and the captured user's feature information during the setting process. The selection instruction is such as triggered by the user's clicking to check, double-clicking, and the like. The display brightness information list contains one or more display brightness pair information, and each display brightness information corresponds to a display brightness value. The display brightness information is such as displayed in the form of text or pictures, or presented by sliding the horizontal bar. When receiving the user's sliding instruction on the horizontal bar, the display brightness of the terminal is adjusted immediately, so that the user can intuitively set the display brightness to be adjusted by the currently entered feature information.

In some embodiments, when the terminal is in a listening mode, the feature information is human ear feature information, and the human ear feature information includes ear contour information. The listening mode is different from the microphone mode, and the speakerphone mode is not performed. In the listening mode, the user generally listens the caller's sound by holding the terminal close to the ear. The step of "capturing the feature information of the user, and determining whether the captured feature information matches the feature information in the brightness configuration information" includes: capturing the user's ear contour information, and determining whether the captured ear contour information matches the ear contour information in the brightness configuration information. When the terminal is close to the human ear, the sensing unit placed under the display unit can capture image of the ear or recognize a multi-frame image of the ear contour that becomes larger and larger from far to near. By matching the image captured by the sensing unit with the preset ear contour information, it is determined whether the current user is in the listening mode. If yes, the screen display brightness of the current terminal will be adjusted. In some embodiment, the "adjusting the screen display brightness of the current terminal" includes dimming the display brightness of the current terminal as much as possible to achieve the purpose of saving power consumption.

In some embodiments, when the terminal is in a microphone mode, the feature information is fingerprint feature information, and the microphone mode is triggered by a user clicking a first button. The microphone mode is the speakerphone mode. At present, when a terminal receives an incoming call or voice, it usually displays multiple operation buttons on the display screen. When the user clicks the first button (such as the "speaker" button displayed on the screen), the microphone mode is triggered. The step of "capturing the feature information of the user, and determining whether the captured feature information matches the feature information in the brightness configuration information" includes: capturing the fingerprint feature information of the user while receiving the user's instruction of clicking to the first button, and determining whether the captured fingerprint feature information matches the fingerprint feature information in the brightness configuration information. Since the sensing unit is arranged under the display screen, when the user clicks on the first button, the fingerprint information of the user can be collected synchronously, thereby realizing the adjustment of the display brightness of the terminal in the microphone mode to achieve the purpose of saving power.

In other embodiments, when the terminal is in a microphone mode, the feature information is also such as face feature information or lip feature information, the face feature information includes face contour information, and the lip feature information includes lip contour information. When the terminal is in the microphone mode, the user's face or lips can be aligned with the screen to trigger the sensing unit to acquire face contour information or lip contour information, thereby realizing the adjustment of the display brightness of the terminal after the acquired information is successfully matched, to achieve the purpose of saving power in the microphone mode.

In some embodiment, "determining whether the captured feature information matches the feature information in the brightness configuration information" includes: determining whether the degree of matching between the captured feature information and the feature information in the brightness configuration information reaches a preset percentage, and if so, it is determined to be a match, otherwise it is determined to be a mismatch. The feature information includes multiple feature items, and the matching degree is such as obtained by setting different weight values for different feature items and performing accumulation calculation. In the actual application process, the weight value of the face contour is set larger, while the weight values of the eyes, lips and other parts are set smaller. The feature information is obtained finally by multiply the matching degree (the smaller the difference from the preset value, the higher the matching degree, which can be defined by a value) of each feature item (face contour, glasses, lips, etc.) and the weight value corresponding to each feature item. The matching degree is compared with the preset percentage to determine whether the current feature information matches the feature information in the brightness configuration information.

In some embodiments, the method further includes the step of generating a prompt message when determining that the captured feature information does not match the feature information in the brightness configuration information. The prompt message includes one or more of sound prompt message, image prompt message, light prompt message, and video prompt message. The sound prompt message includes voice prompt message prompting the user that the captured feature information does not match the feature information in the brightness configuration information. The image prompt message includes popup prompt message prompting the user that the captured feature information does not match the feature information in the brightness configuration information. The video prompt message includes animation prompt message prompting the user that align again the portion including the feature information to the screen again so that the sensing unit can capture user feature information. The light prompt message includes changing the brightness of the screen or making the display screen emit light of different colors.

In order to further save power consumption, not only the screen brightness of the terminal is adjusted, but also the volume is appropriately reduced accordingly when the terminal responds to an event (such as receiving an incoming call). Therefore, in some embodiments, the method further includes the step of setting volume configuration information in advance. The volume configuration information includes a correspondence relationship between the user's feature information and a volume level. After the step of "determining whether the captured feature information matches the feature information in the brightness configuration information", the method includes: If yes, the volume of the current terminal is adjusted to the volume corresponding to the feature information in the volume feature information, otherwise the volume of the terminal is not adjusted.

In some embodiments, the sensing unit includes a light detection sensing layer. The display pixels of the display unit is configured to emit light with a predetermined pattern when a light source trigger signal is received by the light detection sensing layer. Furthermore, the light detection sensing layer is configured to be in a light signal detection state and receive an image signal reflected by a user's feature portion to capture the user's feature information when a detection trigger signal is received. The preset pattern is such as triggered according to an event received by the current terminal. For example, if the event is an incoming call, a phone or handset pattern will be displayed on the display screen for the user. In addition, whether the sensing unit is turned on or off is determined according to whether the terminal is responding to an event. For example, the sensing unit is turned on when the terminal receives a call and the sensor unit is turned off when the terminal does not receive a call, so as to effectively avoid user misuse.

Figure 5:
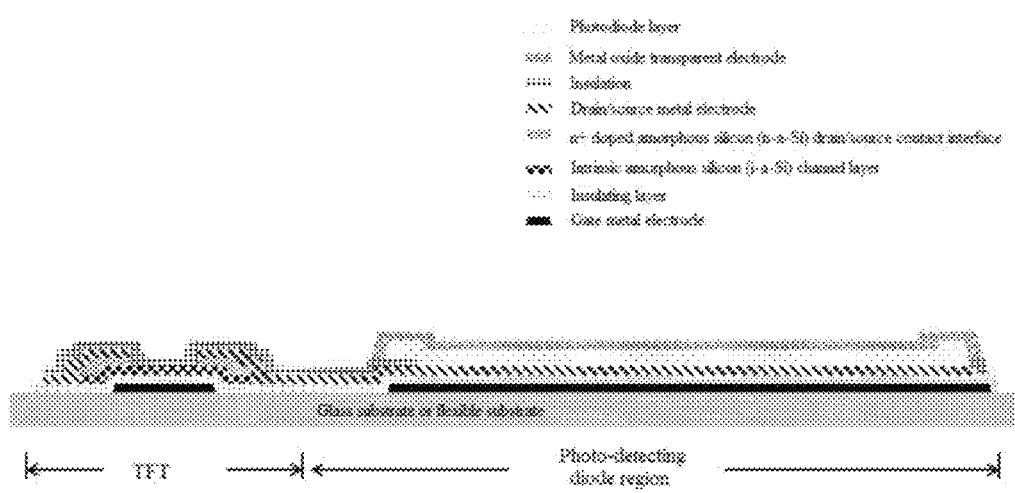
FIG. 5 is a schematic diagram of a sensing unit of a terminal according to an embodiment of the present disclosure.

As shown in FIG. 5, in the present embodiment, the sensing unit includes a TFT image sensing array film, the light detection sensing layer comprises an array formed by photodiodes. An LCD panel or an OLED display panel is driven by a TFT structure to scan a single pixel to realize a display function of a pixel array on the panel. A main structure for forming a TFT switching function is an MOSFET, wherein well-known semiconductor layer materials mainly include amorphous silicon, polycrystalline silicon, IGZO, organic compounds mixed with nano carbon materials, etc. Since the structure of a photo-sensing diode can also be prepared from such semiconductor materials, and production equipment is also compatible with the production equipment of TFT arrays, a TFT photo-detecting diode has started to be produced by a TFT array preparation method in recent years. The TFT image sensing array film described in the present embodiment is the above-mentioned TFT photo-detecting diode (e.g., a photo-sensing diode region part in FIG. 5). A specific structure may refer to descriptions on the structure of the sensing unit in a U.S. Pat. No. 6,943,070B2 and a PRC patent CN204808361U. A production process of the TFT image sensing array film is different from that of a TFT structure of the display panel in that an original pixel starting region of the display panel is changed to a photo-sensing in the production process. The TFT may be prepared by a method of using thin glass as a substrate or using a high temperature-resistant plastic material as the substrate, as described in the U.S. Pat. No. 6,943,070B2.

In order to make it possible to adjust display brightness of the terminal even in a dark environment, in some embodiments, the photodiode is an infrared photodiode. The infrared photodiode includes the infrared sensing layer, and the infrared sensing layer is configured to receive the infrared light signal so that the sensing unit can capture the user's feature information in the dark environment, thereby realizing the adjustment the display brightness of the terminal. The sensing unit shown in FIG. 5 is susceptible to the reflection and refraction of surrounding ambient light or visible light emitted by the pixels of the display screen and other factors, causing optical interference and seriously affecting the signal-to-noise ratio (SNR) of the TFT image sensing array film embedded under the display panel. In order to improve the SNR, a further improvement can be made on the sensing unit shown in FIG. 5, so that the TFT image sensing array film can detect the infrared signal of the user's feature information.

Figure 6:
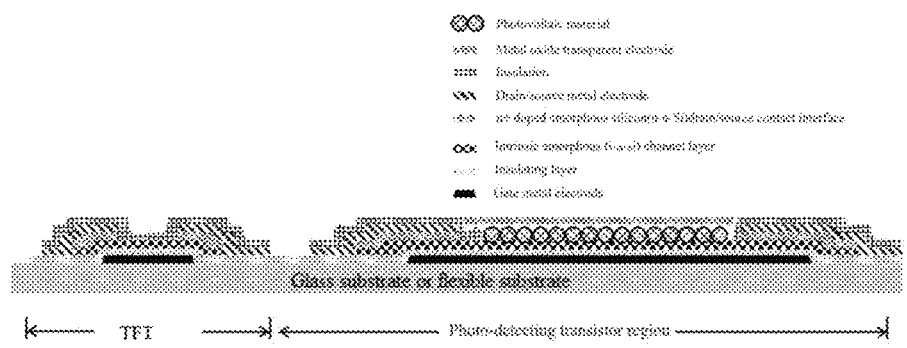
FIG. 6 is a schematic diagram of a sensing unit of a terminal according to another embodiment of the present disclosure.

As shown in FIG. 6, in order to expand the wavelength of the optical signal that can be recognizable by the TFT image sensing array film from the visible light range to the infrared light range, it is necessary to improve the TFT image sensing array film shown in FIG. 5. The improvement is specifically to replace the photodiode layer of the TFT image sensing array film shown in FIG. 5 by using an infrared photodiode, and the infrared photodiode includes a microcrystalline silicon photodiode or an amorphous silicon compound photodiode.

In some embodiment, the amorphous silicon p-type/i-type/n-type photo diode structure (i.e., photodiode layer shown in FIG. 6) was changed to a microcrystalline silicon p-type/i-type/n-type photodiode structure. In this embodiment, the degree of micro-crystallization of the photodiode is mainly determined by mixing gaseous hydrogen silane (SiH4) with appropriate concentration of hydrogen to control the hydrogen bond to bind with the dangling bond of the amorphous silicon during the chemical vapor deposition process, so as to achieve the coating of microcrystalline silicon p-type/i-type/n-type photodiode structure. By adjusting the hydrogen concentration of chemical vapor deposition process, the operating wavelength range of the microcrystalline photodiode can be expanded to the light wavelength range of 600 nm to 1000 nm.

In the embodiment using the microcrystalline photodiode, in order to further improve the quantum efficiency of the photoelectric conversion, the microcrystalline silicon photodiode can also be formed by serially connecting double junction or multi junction p-type/i-type/n-type structures. The p-type/i-type/n-type material of the first junction layer of the photodiode is still an amorphous structure, and the p-type/i-type/n-type material of the second junction layer or the other junction layers may be a microcrystalline structure or a polycrystalline structure.

In some embodiment, the amorphous silicon p-type/i-type/n-type photodiode structure (photodiode layer in FIG. 5) is changed to a p-type/i-type/n-type photodiode structure doped with an amorphous silicon compound having an expandable photosensitive wavelength range. The amorphous silicon compound of a preferred embodiment is amorphous silicon germanium. In this embodiment, during the coating process of intrinsic layer (i type) of the photodiode by using chemical vapor deposition method, gas germane (GeH4) mixed with silane (SiH4) was introduced, so that the photosensitive range of the amorphous silicon germanium p-type/i type/n-type photodiode can reach a wavelength range of 600 nm to 1000 nm.

In the embodiment using the amorphous silicon compound photodiode, in order to improve the quantum efficiency of the photoelectric conversion, the amorphous silicon photodiode can also be formed by serially connecting double junction or multi junction p-type/i-type/n-type structures. The p-type/i-type/n-type material of the first junction layer of the photodiode is still an amorphous silicon structure, and the p-type/i-type/n-type material of the second junction layer or the other layers may be a microcrystalline structure, a polycrystalline structure, or a material doped with a compound having an expandable photosensitive wavelength range.

When the infrared sensing layer is an array formed by an infrared photosensitive diode, in actual application, a TFT is used for scanning, driving, and adding a bias voltage between the p-type/i-type/n-type photodiodes, which will make the infrared photodiode in the state of detecting the infrared light signal, realizing the function of TFT image sensing array film emitting infrared light.

In some embodiments, the first trigger signal may be triggered by applying a positive bias between the p-type/i-type/n-type infrared photodiode; and the second trigger signal may be triggered by applying a zero bias or a negative bias between the p-type/i-type/n-type infrared photodiode. For example, if the array formed by the infrared photodiode is assumed to have 10 columns (assuming the number is 1 to 10), then a positive bias is applied to odd-numbered pixel arrays so that the odd-numbered columns of pixel array can emit infrared light signals, and a zero bias or a negative bias is applied to even-numbered pixel arrays, so that the even-numbered columns of pixel arrays are in the infrared light detecting state, thus capturing the infrared light reflected from the location where the user's characteristic information is located and converting the infrared light into an infrared image for output. Of course, in some embodiments, the first trigger signal may be triggered by applying a zero bias or a negative bias between the p-type/i-type/n-type infrared photodiode; and the second trigger signal may be triggered by applying a positive bias between the p-type/i-type/n-type infrared photodiode.

In some embodiments, a positive bias and a zero bias or a negative bias may be alternately applied between the p-type/i-type/n-type infrared photodiode to trigger the first trigger signal or the second trigger signal. Similarly, an array formed by the infrared photodiodes with 10 columns of pixel arrays is taken as an example, during the first period, a positive bias is applied to the p-type/i-type/n-type infrared photodiode, so that the 10 columns of pixel arrays are all in an infrared light emitting state; during the second period, a zero bias or a negative bias is applied to the p-type/i-type/n-type infrared photodiode, so that the 10 columns of pixel arrays are all in the infrared light detecting state, which is used for capturing the infrared light information reflected from the location where the user's characteristic information is located and generating a corresponding infrared image output; during the third period, a positive bias is further applied to the p-type/i-type/n-type infrared photodiode, so that the 10 columns of pixel arrays are all in the infrared light emitting state; and repeatedly alternated in the same manner. The light source trigger signal (first trigger signal) and the detection trigger signal (second trigger signal) are alternately switched in a preset frequency. The time interval between adjacent periods can be set according to the actual needs. In some embodiment, the time interval can be set as the time required for the TFT array to drive scanning each frame of infrared photodiode array to receive at least one frame of complete image signal, that is, the preset frequency is that the switch is performed every said time interval.

Figure 4:
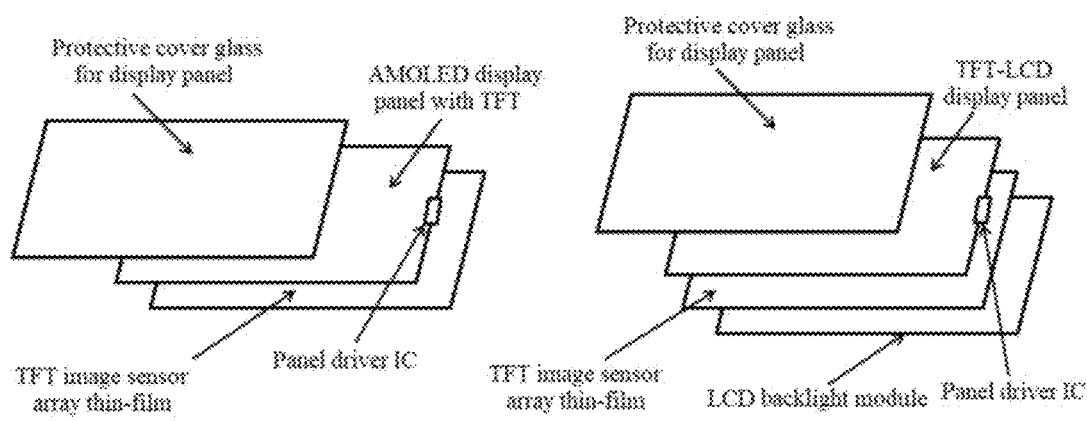
FIG. 4 is a schematic diagram of a terminal according to another embodiment of the present disclosure.

As shown in FIG. 4, in some embodiments, the display unit is the LCD screen, a backlight unit is disposed under the sensing unit; and the sensing unit is disposed between the backlight unit and the LCD screen. Since the LCD screen is not a self-illuminating component, the backlight unit needs to be added under the sensing units during installation. The backlight unit may be an LCD backlight module or other electronic components having a self-illuminating function. In some other embodiments, when the display unit is the AMOLED display screen, the backlight unit is unnecessary to be provided due to the OLED display screen is a self-illuminating component. By setting the above two solutions, production requirements of different manufacturers can be effectively met; and an application range of the device is expanded In some embodiments, the feature recognition area includes a plurality of feature recognition sub-areas, and a sensing unit is disposed corresponding to each of the feature recognition sub-areas. The terminal further includes a sensing unit control circuit, the method further including: receiving a instruction of the user for starting the feature recognition sub-area, the sensing unit control circuit turning on the sensing unit under the feature recognition sub-area, and receiving another instruction of the user for closing the feature recognition sub-area, the sensing unit control circuit turning off the sensing unit under the feature recognition sub-area.

Taking the feature recognition area including two feature recognition sub-areas as an example, the two feature recognition sub-areas are evenly distributed on the screen, one is up and one is down, or one is left and one is right, or distributed in the screen in other arrangements. The following is a detailed description of the application process of the device having two feature recognition sub-areas: in the process of using, the user sets the two feature recognition sub-areas to the on state by the start instruction. In the preferred embodiment, the range of the two feature recognition sub-areas covers the entire display screen, so that when both feature recognition sub-areas are set to the on state, the light signal entering the display screen can be acquired by the TFT image sensing array film (i.e. light detection device) below, thereby capturing the user's feature information.

In other embodiments, the range of the two feature recognition sub-areas may also occupy ⅔, ¾, etc. of the entire display screen region. Of course, the user can also set one feature recognition sub-area to be turned on and the other feature recognition sub-area to be turned off according to his or her preference. It is also possible to set both recognition sub-regions to the off state when no operation is required on the device. In short, the sensing unit under each feature recognition sub-area can be set to be turned on or off according to the user's own preferences.

Figure 3:
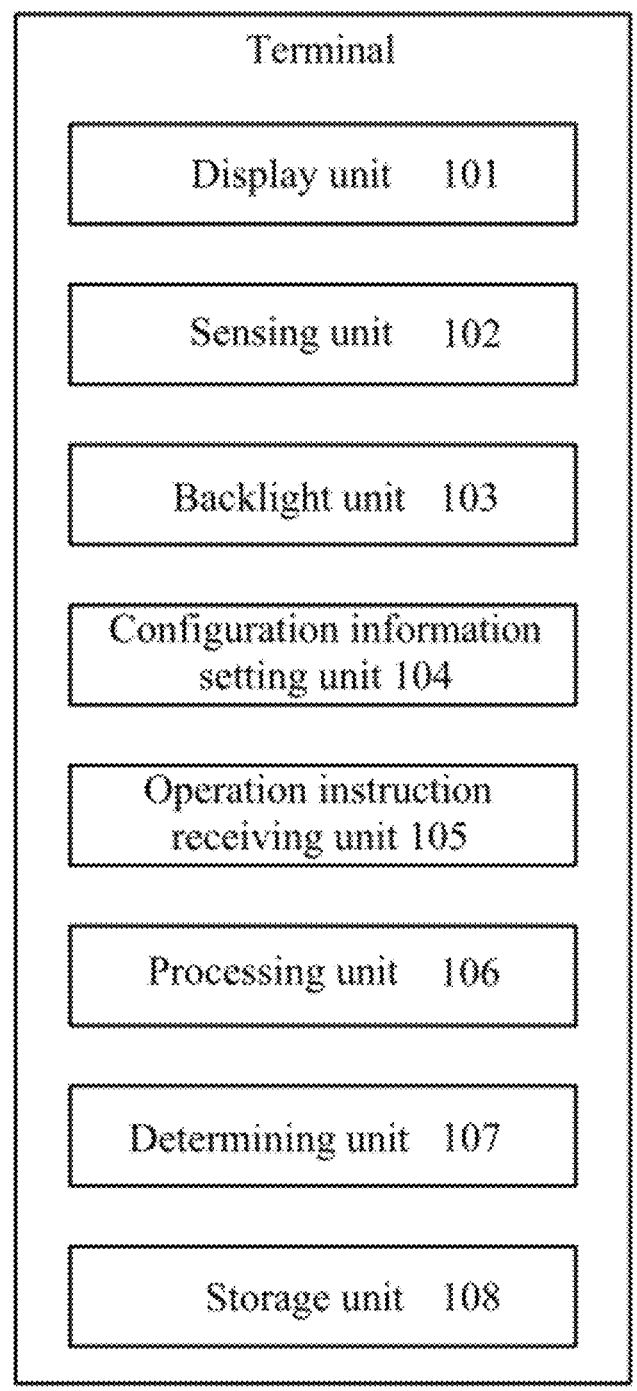
FIG. 3 is a schematic diagram of a terminal according to an embodiment of the present disclosure.

Please refer to FIG. 3, which is a schematic diagram of a terminal according to an embodiment of the present disclosure. The terminal includes a display unit 101 and a sensing unit 102, a feature recognition area is disposed on the display unit 101, the sensing unit 102 is located under the feature recognition area and is configured to capture feature information of a user; the terminal further includes a configuration information setting unit 104, a determining unit 107, and a processing unit 106;

The configuration information setting unit 104 is configured to set the brightness configuration information in advance, and the brightness configuration information includes a correspondence relationship between feature information of a user and display brightness;

The sensing unit 102 is configured to capture the feature information of the user and the determining unit 107 is configured to determine whether the captured feature information matches the feature information in the brightness configuration information; if yes, the processing unit 106 is configured to adjust the display brightness of the terminal to the display brightness corresponding to the matched feature information in the brightness configuration information; otherwise, the processing unit 106 does not adjust the display brightness of the terminal. The feature information includes one or more of face feature information, fingerprint feature information, human ear feature information, and lip feature information.

In some embodiments, the terminal further includes an operation instruction receiving unit, "the configuration information setting unit is configured to set the brightness configuration information in advance" includes: the operation instruction receiving unit 105 is configured to receive a setting instruction of the user and display the feature recognition area; the sensing unit 102 is configured to capture and save the feature information of the user during the setting process; the display unit 101 is configured to display a display brightness information list, the operation instruction receiving unit is configured to receive a user's selection instruction for display brightness information, and the processing unit 106 is configured to establish and save the correspondence relationship between the selected display brightness information and the captured feature information of the user during the setting process. The brightness configuration information is such as stored in a storage unit 108 of the terminal, such as the memory of the mobile phone, the hard disk of the computer. Or the brightness configuration information is stored in a storage unit of the server, when the brightness configuration information is needed, only by making the terminal being communication connection with the server, the pre-stored brightness configuration information will be gotten from the server. The communication connection includes a wired communication connection or a wireless communication connection.

In some embodiments, when the terminal is in a listening mode, the feature information is human ear feature information, and the human ear feature information includes ear contour information; "the sensing unit is configured to capture the feature information of the user and the determining unit is configured to determine whether the captured feature information matches the feature information in the brightness configuration information" includes: the sensing unit is configured to capture the ear contour information of the user, and the determining unit is configured to determine whether the captured ear contour information matches the ear contour information in the brightness configuration information.

In some embodiments, the terminal includes an operation instruction receiving unit. When the terminal is in a microphone mode, the feature information is fingerprint feature information, and the microphone mode is triggered by the user clicking a first button; "the sensing unit is configured to capture the feature information of the user and the determining unit is configured to determine whether the captured feature information matches the feature information in the brightness configuration information" includes: the operation instruction receiving unit is configured to capture the fingerprint feature information of the user while the sensing unit is configured to receive the user's instruction of clicking to the first button, and the determining unit is configured to determine whether the captured fingerprint feature information matches the fingerprint feature information in the brightness configuration information.

In some embodiments, "the determining unit is configured to determine whether the captured feature information matches the feature information in the brightness configuration information" includes: the determining unit is configured to determine whether the matching degree between the captured feature information and the feature information in the brightness configuration information reaches a preset percentage, and if so, it is determined to be a match, otherwise it is determined to be a mismatch.

In some embodiments, the processing unit is further configured to generate a prompt message when the determining unit determines that the captured feature information does not match the feature information in the brightness configuration information. The prompt message includes one or more of sound prompt message, image prompt message, light prompt message, and video prompt message.

In some embodiments, the configuration information setting unit is configured to preset volume configuration information; the volume configuration information includes a correspondence relationship between the feature information of the user and a volume level, the determining unit is configured to determine whether the captured feature information matches the feature information in the brightness configuration information", if yes, the processing unit is configured to adjust the volume of the terminal to a volume corresponding to the matched feature information in the volume feature information, otherwise the processing unit does not adjust the volume of the terminal.

In some embodiments, the sensing unit includes a light detection sensing layer, the display pixels of the display unit is configured to emit light with a predetermined pattern when a light source trigger signal is received by the light detection sensing layer; and the light detection sensing layer is also configured to be in a light signal detection state and receive an image signal reflected by a user's feature portion to capture the user's feature information when a detection trigger signal is received. In some embodiment, the sensing unit includes a TFT image sensing array film, the light detection sensing layer comprises an array formed by photodiodes. The light source trigger signal and the detection trigger signal are alternately switched in a preset frequency.

In some embodiments, the display unit is a display panel using active array thin film transistors for scan driving and transmitting data. The display unit includes an AMOLED display, a liquid crystal display, a micro light emitting diode display, a quantum dot display, or an electronic ink display. As shown in FIG. 4, the display unit is the LCD screen, a backlight unit is disposed under the sensing unit, and the sensing unit is disposed between the backlight unit and the LCD screen.

In some embodiments, the feature recognition area includes a plurality of feature recognition sub-areas, and a sensing unit is disposed corresponding to each of the feature recognition sub-areas. The terminal further includes a sensing unit control circuit, the operation instruction receiving unit is configured to receive a instruction of the user for starting the feature recognition sub-area, the sensing unit control circuit is configured to turn on the sensing unit under the feature recognition sub-area, and the operation instruction receiving unit is configured to receive another instruction of the user for closing the feature recognition sub-area, the sensing unit control circuit is configured to turn off the sensing unit under the feature recognition sub-area.

The advantages of the present disclosure are: with a sensing unit and the feature recognition area of the display unit, when the terminal receives an incoming call, as long as the feature information of the user is captured and compared with the feature information in the brightness configuration information, if it matches, the display brightness can be adjusted. Compared with the method of speech recognition, the user can adjust the screen brightness as long as the user approaches to a specific part to captures features without the need for the user to input additional speech, effectively improving the user's experience. In addition, when the sensing unit of the present disclosure is directly disposed below the display unit, no additional sensor (such as a distance sensor) is needed to effectively reduce the overall thickness of the mobile device, so that the mobile device is thinner, and meets market demands. The adjustment of the display brightness is achieved by capturing the user's feature information for comparison, avoiding misoperation by the user and improving the accuracy of the screen brightness adjustment.

It should be noted that the relational terms herein such as first and second are used only to differentiate an entity or operation from another entity or operation, and do not require or imply any actual relationship or sequence between these entities or operations. In addition, term "comprise", "include", or any other variant thereof aims to cover non-exclusive "include", so that a process, method, object, or terminal device that comprises a series of elements not only comprises the elements, but also comprises other elements that are not definitely listed, or further comprises inherent elements of the process, method, object, or terminal device. In a case in which there are no more limitations, an element defined by the sentence "comprise . . . " or "include . . . " does not exclude the case in which other elements further exist in a process, method, or object, or terminal device that comprises the element. In addition, in this text, "greater than", "less than", "exceed", and the like are understood as not including the number. "More", "fewer", "within", and the like are understood as including the number.

Although the foregoing embodiments are described, once a person skilled in the art learns a basic inventive concept, the person skilled in the art may make additional changes and modifications to these embodiments. Therefore, the foregoing descriptions are merely embodiments of the present disclosure, and are not intended to limit the patent protection scope of the present disclosure. Any equivalent structural change or any equivalent process change that is made by using the contents of the description and the accompanying drawings of the present disclosure is directly or indirectly applied to technical fields related thereto, and likewise falls into the patent protection scope of the present disclosure.

The invention claimed is:

1. A method for adjusting display brightness of a terminal, characterized in that, the method is applied to a terminal, the terminal comprises a display unit and a sensing unit, the display unit is provided with a feature recognition area, the sensing unit is configured to capture feature information of a user, the method comprises:

presetting brightness configuration information, the brightness configuration information comprising a correspondence relationship between feature information of a user and display brightness;

capturing a feature information of the user when the terminal is in a particular operating mode, and determining whether the captured feature information matches feature information in the brightness configuration information; if yes, adjusting the display brightness of the terminal to the display brightness corresponding to the matched feature information in the brightness configuration information; otherwise, not adjusting the display brightness of the terminal;

wherein when the terminal is in a first operating mode, a first feature information of the user is captured, when the terminal is in a second operating mode, a second feature information of the user is captured, and the first feature information is different from the second feature information.

2. The method for adjusting display brightness of a terminal according to claim 1, characterized in that, presetting the brightness configuration information comprises:

receiving a user setting instruction and displaying the feature recognition area;

capturing and saving the feature information of the user during the setting process;

displaying a display brightness information list, receiving a user's selection instruction for display brightness information, and establishing and saving the correspondence relationship between the selected display brightness information and the captured feature information of the user during the setting process.

3. The method for adjusting display brightness of a terminal according to claim 1, characterized in that, when the terminal is in a listening mode, the feature information comprises human ear feature information, and the human ear feature information comprises ear contour information; "capturing the feature information of the user, and determining whether the captured feature information matches the feature information in the brightness configuration information" comprises: capturing the ear contour information of the user, and determining whether the captured ear contour information matches the ear contour information in the brightness configuration information.

4. The method for adjusting display brightness of a terminal according to claim 1, characterized in that, when the terminal is in a microphone mode, the feature information comprises fingerprint feature information, and the microphone mode is triggered by the user clicking a first button; "capturing the feature information of the user, and determining whether the captured feature information matches the feature information in the brightness configuration information" comprises: capturing the fingerprint feature information of the user while receiving the user's instruction of clicking the first button, and determining whether the captured fingerprint feature information matches the fingerprint feature information in the brightness configuration information.

5. The method for adjusting display brightness of a terminal according to claim 1, characterized in that, "determining whether the captured feature information matches the feature information in the brightness configuration information" comprises: determining whether a matching degree between the captured feature information and the feature information in the brightness configuration information reaches a preset percentage, and if so, it is determined to be a match, otherwise it is determined to be a mismatch.

6. The method for adjusting display brightness of a terminal according to claim 1, characterized in that, the method further comprises presetting volume configuration information; the volume configuration information comprises a correspondence relationship between the feature information of the user and a volume level, after "determining whether the captured feature information matches the feature information in the brightness configuration information", the method further comprises: if yes, adjusting the volume of the terminal to a volume corresponding to the matched feature information in the volume feature information, otherwise not adjusting the volume of the terminal.

7. The method for adjusting display brightness of a terminal according to claim 1, characterized in that, the sensing unit comprises a light detection sensing layer, the display pixels of the display unit is configured to emit light with a predetermined pattern when a light source trigger signal is received by the light detection sensing layer; and the light detection sensing layer is configured to be in a light signal detection state and receive an image signal reflected by a user's feature portion to capture the user's feature information when a detection trigger signal is received.

8. The method for adjusting display brightness of a terminal according to claim 7, characterized in that, the light source trigger signal and the detection trigger signal are alternately switched in a preset frequency.

9. The method for adjusting display brightness of a terminal according to claim 1, characterized in that, the feature recognition area comprises a plurality of feature recognition sub-areas, and a sensing unit is disposed corresponding to each of the feature recognition sub-areas.

10. The method for adjusting display brightness of a terminal according to claim 9, characterized in that, the terminal further comprises a sensing unit control circuit, the method further comprising:

receiving a first instruction of the user for starting the feature recognition sub-area, the sensing unit control circuit turning on the sensing unit under the feature recognition sub-area, and receiving a second instruction of the user for closing the feature recognition sub-area, the sensing unit control circuit turning off the sensing unit under the feature recognition sub-area.

11. The method for adjusting display brightness of a terminal according to claim 1, characterized in that, the method comprises: when the terminal is in a microphone mode, capturing fingerprint feature information, face feature information or lip feature information of the user, and determining whether the captured fingerprint feature information matches fingerprint feature information in the brightness configuration information, or determining whether the captured face feature information matches face feature information in the brightness configuration information, or determining whether the captured lip feature information matches lip feature information in the brightness configuration information, if yes, adjusting the display brightness of the terminal to the display brightness corresponding to the matched fingerprint feature information or face feature information or lip feature information in the brightness configuration information; otherwise, not adjusting the display brightness of the terminal.

12. A terminal, characterized in that, the terminal comprises a display unit and a sensing unit, the display unit is provided with a feature recognition area, the sensing unit is configured to capture feature information of a user; the terminal further comprises a configuration information setting unit, a determining unit, and a processing unit;

the configuration information setting unit is configured to preset the brightness configuration information, and the brightness configuration information comprises a correspondence relationship between feature information of a user and display brightness;

the sensing unit is configured to capture a feature information of the user when the terminal is in a particular operating mode and the determining unit is configured to determine whether the captured feature information matches feature information in the brightness configuration information; if yes, the processing unit is configured to adjust the display brightness of the terminal to the display brightness corresponding to the matched feature information in the brightness configuration information; otherwise, the processing unit does not adjust the display brightness of the terminal;

wherein when the terminal is in a first operating mode, a first feature information of the user is captured, when the terminal is in a second operating mode, a second feature information of the user is captured, and the first feature information is different from the second feature information.

13. The terminal according to claim 12, characterized in that, the terminal further comprises an operation instruction receiving unit, "the configuration information setting unit being configured to preset the brightness configuration information in advance" comprises:

the operation instruction receiving unit being configured to receive a setting instruction of the user and display the feature recognition area;

the sensing unit being configured to capture and save the feature information of the user during the setting process;

the display unit being configured to display a display brightness information list, the operation instruction receiving unit being configured to receive a user's selection instruction for display brightness information, and the processing unit being configured to establish and save the correspondence relationship between the selected display brightness information and the captured feature information of the user during the setting process.

14. The terminal according to claim 12, characterized in that, when the terminal is in a listening mode, the feature information is human ear feature information, and the human ear feature information comprises ear contour information; "the sensing unit being configured to capture the feature information of the user and the determining unit being configured to determine whether the captured feature information matches the feature information in the brightness configuration information" comprises:

the sensing unit being configured to capture the ear contour information of the user, and the determining unit being configured to determine whether the captured ear contour information matches the ear contour information in the brightness configuration information.

15. The terminal according to claim 12, characterized in that, the terminal comprises an operation instruction receiving unit, when the terminal is in a microphone mode, the feature information is fingerprint feature information, and the microphone mode is triggered by the user clicking a first button; "the sensing unit being configured to capture the feature information of the user and the determining unit being configured to determine whether the captured feature information matches the feature information in the brightness configuration information" comprises:

the operation instruction receiving unit being configured to capture the fingerprint feature information of the user while the sensing unit being configured to receive the user's instruction of clicking to the first button, and the determining unit being configured to determine whether the captured fingerprint feature information matches the fingerprint feature information in the brightness configuration information.

16. The terminal according to claim 12, characterized in that, "the determining unit being configured to determine whether the captured feature information matches the feature information in the brightness configuration information" comprises:

the determining unit being configured to determine whether a matching degree between the captured feature information and the feature information in the brightness configuration information reaches a preset percentage, and if so, it is determined to be a match, otherwise it is determined to be a mismatch.

17. The terminal according to claim 12, characterized in that, the configuration information setting unit is configured to preset volume configuration information; the volume configuration information comprises a correspondence relationship between the feature information of the user and a volume level, the determining unit is configured to determine whether the captured feature information matches the feature information in the brightness configuration information", if yes, the processing unit is configured to adjust the volume of the terminal to a volume corresponding to the matched feature information in the volume feature information, otherwise the processing unit does not adjust the volume of the terminal.

18. The terminal according to claim 12, characterized in that, the sensing unit comprises a light detection sensing layer, the display pixels of the display unit is configured to emit light with a predetermined pattern when a light source trigger signal is received by the light detection sensing layer; and the light detection sensing layer is configured to be in a light signal detection state when receive an image signal reflected by a user's feature portion to capture the user's feature information when a detection trigger signal is received.

19. The terminal according to claim 18, characterized in that, the light source trigger signal and the detection trigger signal are alternately switched in a preset frequency.

20. The terminal according to claim 13, characterized in that, the feature recognition area comprises a plurality of feature recognition sub-areas, and a sensing unit is disposed corresponding to each of the feature recognition sub-areas.

21. The terminal according to claim 20, characterized in that, the terminal further comprises a sensing unit control circuit, the operation instruction receiving unit is configured to receive a first instruction of the user for starting the feature recognition sub-area, the sensing unit control circuit is configured to turn on the sensing unit under the feature recognition sub-area, and the operation instruction receiving unit is configured to receive a second instruction of the user for closing the feature recognition sub-area, the sensing unit control circuit is configured to turn off the sensing unit under the feature recognition sub-area.

22. The terminal according to claim 12, characterized in that, when the terminal is in a microphone mode, the sensing unit is configured to capture fingerprint feature information, face feature information or lip feature information of the user, and the determining unit is configured to determine whether the captured fingerprint feature information matches fingerprint feature information in the brightness configuration information, or determine whether the captured face feature information matches face feature information in the brightness configuration information, or determine whether the captured lip feature information matches lip feature information in the brightness configuration information, if yes, the processing unit is configured to adjusting the display brightness of the terminal to the display brightness corresponding to the matched fingerprint feature information or face feature information or lip feature information in the brightness configuration information; otherwise, the processing unit does not adjust the display brightness of the terminal.

* * * * *